(12) United States Patent
Kartha et al.

(10) Patent No.: US 10,392,889 B2
(45) Date of Patent: Aug. 27, 2019

(54) DOWNHOLE CABLE GRAB ASSEMBLY AND METHOD OF USE

(71) Applicant: Halliburton Energy Services, Inc., Houston, TX (US)

(72) Inventors: Nikhil Manmadhan Kartha, Singapore (SG); Mark S. Holly, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 163 days.

(21) Appl. No.: 15/300,717

(22) PCT Filed: May 23, 2014

(86) PCT No.: PCT/US2014/039412
§ 371 (c)(1),
(2) Date: Sep. 29, 2016

(87) PCT Pub. No.: WO2015/178935
PCT Pub. Date: Nov. 26, 2015

(65) Prior Publication Data
US 2017/0114604 A1  Apr. 27, 2017

(51) Int. Cl.
*E21B 31/12* (2006.01)
*E21B 31/18* (2006.01)
*B25J 15/00* (2006.01)

(52) U.S. Cl.
CPC ......... *E21B 31/125* (2013.01); *B25J 15/0033* (2013.01); *E21B 31/18* (2013.01)

(58) Field of Classification Search
CPC .............................. E21B 31/125; E21B 31/12
See application file for complete search history.

(56) References Cited

U.S. PATENT DOCUMENTS

| | | | |
|---|---|---|---|
| 1,526,412 A | 2/1925 | Brown | |
| 2,118,991 A | 5/1938 | Turechek et al. | |
| 2,207,649 A | 7/1940 | Williams et al. | |
| 3,152,829 A | 10/1964 | Steele | |
| 4,705,331 A | 11/1987 | Britton | |
| 5,573,064 A * | 11/1996 | Hisaw ..................... | E21B 23/01 166/125 |
| 6,848,507 B2 * | 2/2005 | Huggins ............... | E21B 31/125 166/301 |
| 2004/0262005 A1 | 12/2004 | Harmon et al. | |

OTHER PUBLICATIONS

International Search Report and Written Opinion dated Mar. 20, 2015; International PCT Application No. PCT/US2014/039412.

* cited by examiner

*Primary Examiner* — Catherine Loikith
(74) *Attorney, Agent, or Firm* — McGuireWoods LLP

(57) ABSTRACT

A cable grab assembly includes a body having a longitudinally extending internal cavity disposed therein. A piston is disposed in the cavity and is axially moveable between a first position and a second position. At least two grab arms are hingedly attached to a bottom end of the body. A linkage assembly operatively couples the piston and the at least two grab arms such that movement of the piston between the first position toward the second position causes the at least two grab arms to pivot inward from an open position toward a closed position. A shear-pin restrains the piston to the first position. At least one spring element is disposed between the piston and an end of the cavity to shift the piston from the first position toward the second position to capture a broken cable when the shear-pin is sheared.

13 Claims, 4 Drawing Sheets

DOWNHOLE CABLE GRAB ASSEMBLY AND METHOD OF USE

BACKGROUND OF THE INVENTION

The present disclosure relates generally to fishing tools for retrieving cables and/or other objects from a well.

During downhole well operations, for example in wells for producing petroleum products, a tool string comprising one or more well tools may be inserted into, and retrieved from, a well. The tools may be used to perform a number of well operations, for example well logging, well perforating, setting of well tools, etc. The tool string may be deployed on a cable. As used herein the term cable comprises slickline and wireline cables. Unintended parting of the cable may leave a portion of the cable and a well tool in the well. Retrieval of the cable and the well tool may be time consuming and use up expensive rig time.

BRIEF DESCRIPTION OF THE DRAWINGS

A better understanding of the present invention can be obtained when the following detailed description of example embodiments are considered in conjunction with the following drawings, in which like elements are indicated by like reference indicators.

DETAILED DESCRIPTION

Described below are several illustrative embodiments of the present invention. They are meant as examples and not as limitations on the claims that follow.

Figure 1A:
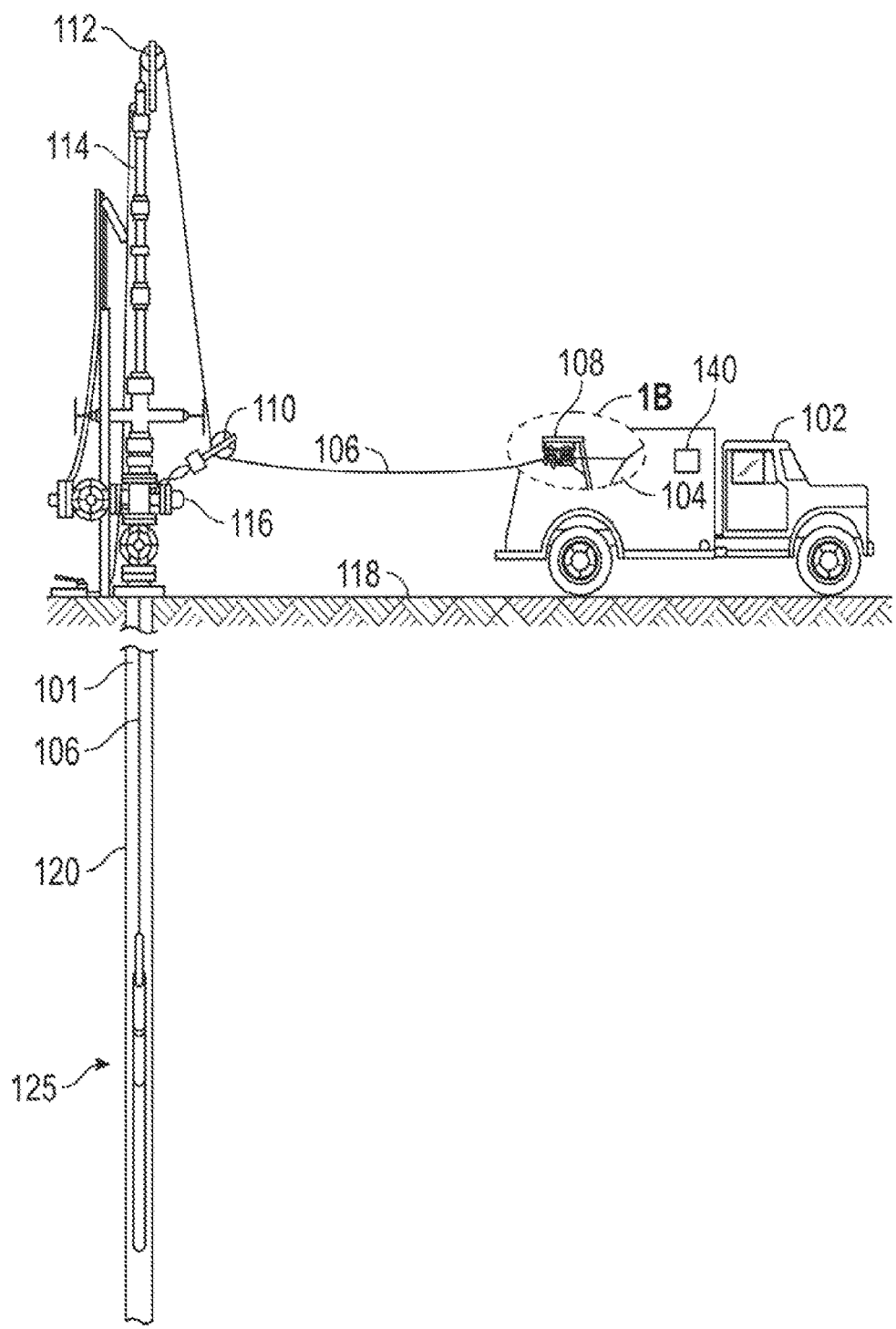
FIG. 1A shows an example of a well service rig-up.
Figures 1B, 2:
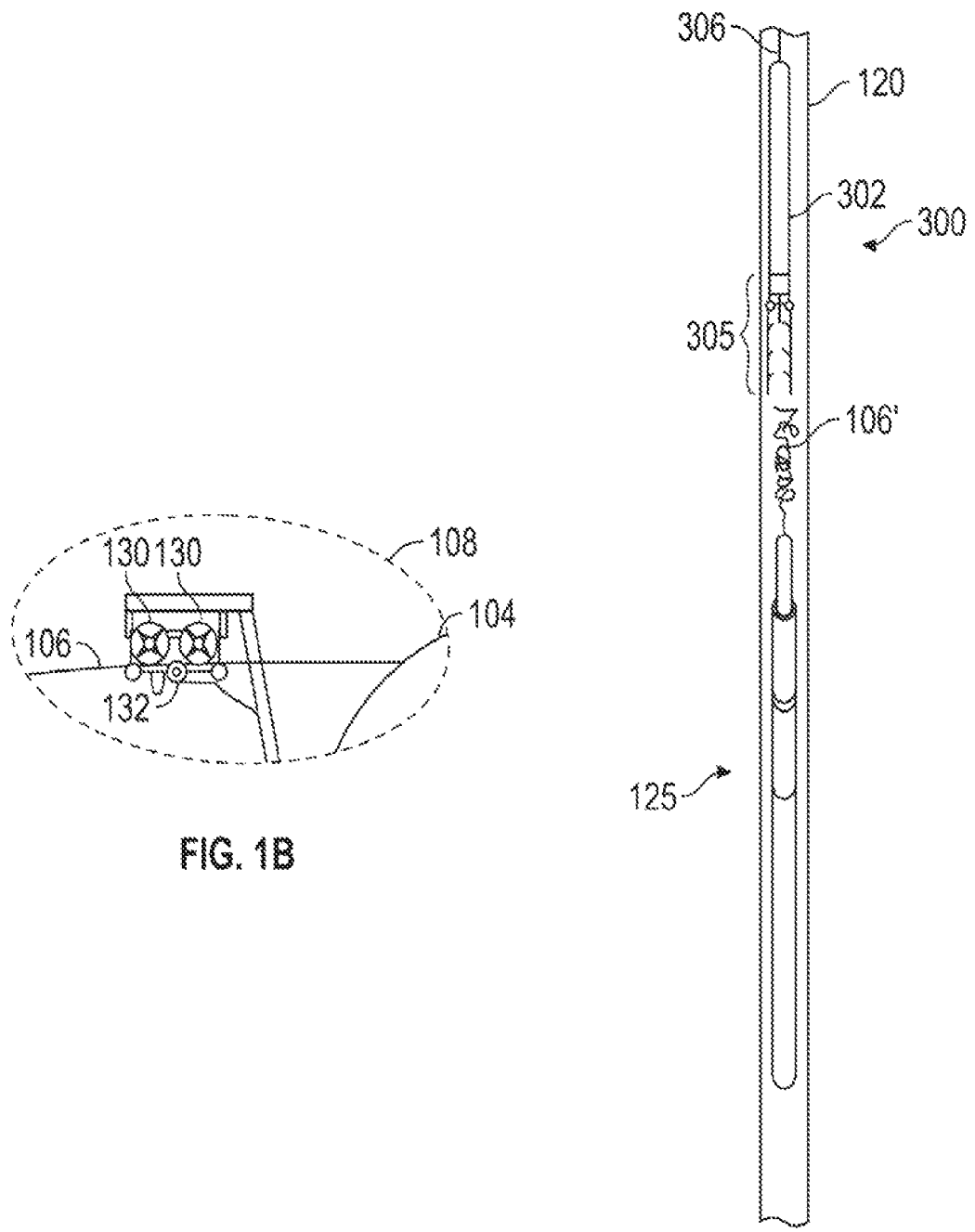
FIG. 1B shows details of a weight/speed indicator shown on FIG. 1A.
FIG. 2 shows a schematic example of a wellbore having well tool string attached to broken cable.

FIGS. 1A and 1B show an example of a rig-up for performing down-hole well operations, also called well services, in a wellbore 101. As used herein, well operations comprise logging, completions, and workover operations. Well services truck 102 may contain a number of different features. For example, for this application, truck 102 contains reel 104, which spools off cable 106 through a weight/speed indicator 108. Cable 106 is rigged through lower sheave wheel 110 and upper sheave wheel 112, and enters the well bore through pressure control equipment 114, used to contain well bore pressure while allowing cable 106 to move freely in and out of the well bore. Cable 106 enters the well bore at wellhead connection 116, upon which pressure control equipment 114 is connected. Below surface 118, pipe or casing 120 proceeds to a bottom depth (not shown). Within casing 120 is well tool string 125, connected to cable 106. Tool string 125 may comprise one, or more, well, tools, including, but not limited to, logging tools completion tools, and workover tools. While shown herein in relation to services in a production well, similar setup may be accomplished on both land and offshore drilling, rigs and drilling platforms.

Weight/speed indicator 108 comprises of at least one, but normally a plurality of measure wheels 130. Measure wheels 130 turn proportionally with cable 106 as it goes into and out of the well bore. Measure wheels 130 may be mechanically connected to a depth encoder device (not shown) that provides digital signals based on the position of the depth wheel. Thus, as cable 106 moves into and out of the well bore 101, a plurality of depth signals are sent to a data handling, system 140 disposed in truck 102 in order to provide the operator with accurate depth data. Additionally, in the example shown, weight/speed indicator 108 contains cable tension wheel 132. Cable tension wheel 132 applies a set amount of pressure against cable 106, in the direction of measure wheels 130. As the amount of cable in the well bore increases, the tension applied by the weight of the cable resists against cable tension wheel 132, causing the load on cable tension wheel 132 to increase toward measure wheels 130. Cable tension wheel 132 is mechanically connected to a load cell, and as the weight of cable 106 increases, causing the load on tension wheel 132 to increase, the load cell sends a signal into the logging compartment of truck 102, indicating an increase in the tension on cable 106.

As used herein the term cable comprises slickline and wireline cables. As used herein, wireline cable comprises braided strength members surrounding a core that contains one or more energy conductors. The energy conductors may comprise electrical conductors, optical fibers, and combinations thereof. The conductors may be configured as single conductors, stranded conductors, coaxial conductors, and combinations thereof. Strength members may include, but are not limited to, metallic materials, non-metallic materials, and combinations thereof. As used herein, slickline cable comprises a single strand strength member having a relatively smooth outer surface.

FIG. 2 shows a schematic of wellbore 101 having well tool string 125 attached to broken cable 106'. Fishing assembly 300 is deployed on fishing deployment member 306 to retrieve cable 106' and tool string 125 to the surface. Fishing deployment member 306 may comprise at least one of a wireline, a slickline, and a coiled tubing known in the art. Fishing assembly 300 may comprise a jarring tool 302 and a cable grab assembly 305 attached to a bottom end of jarring tool 302.

Figure 3:
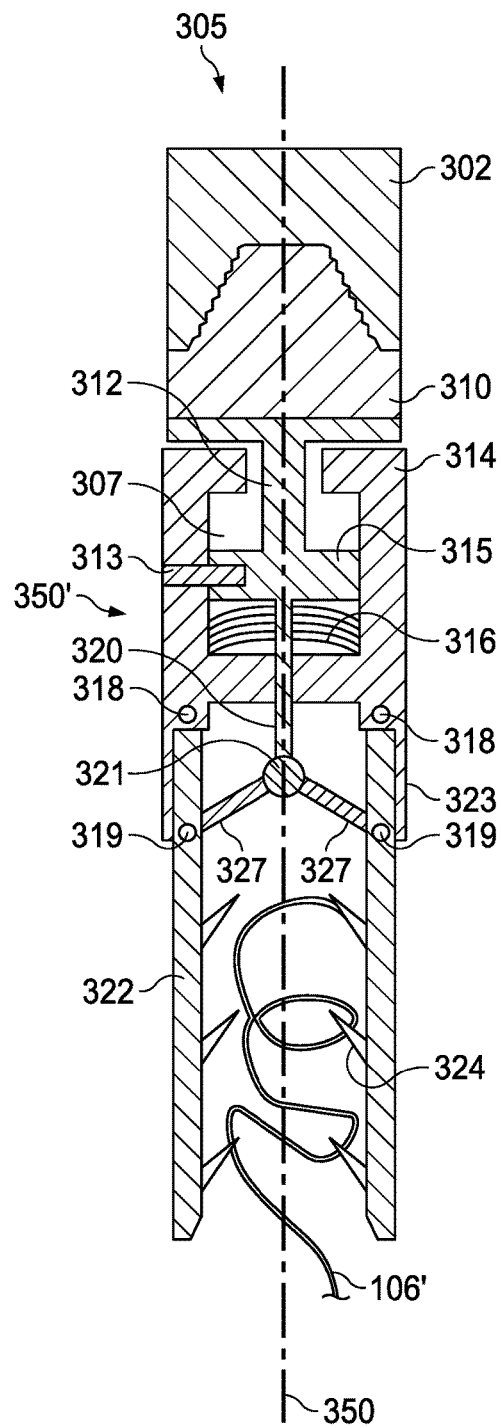
FIG. 3 shows an example of a cable grab assembly in an unactivated condition.

FIG. 3 shows an example of cable grab assembly 305 in an unactivated condition. As shown, cable grab assembly 305 comprises a base 310 having a threaded connection 303 on one end for connecting to jarring tool 302. Alternatively, threaded connection 303 may connect to a cable head (not shown) or other suitable tools (not shown) used in fishing operations. The opposite end of base 310 is attached to connection shaft 312. Connection shaft 312 is attached to piston 315. Connection shaft 312 is designed to accommodate the weight of the remainder of cable grab assembly 305, the retrieved broken cable 106', and any anticipated drag load caused by friction during retrieval from wellbore 101. Those skilled in the art will appreciate that such loadings and designs will commonly be application specific.

Piston 315 is positioned in cavity 307 that is located in housing 314. Piston 315 is movable along longitudinal axis 350 of cable grab assembly 305. In operation, longitudinal axis 350 is substantially parallel to a longitudinal axis of wellbore 101. Spring 316 is positioned between a bottom side of piston 315 and the bottom end of cavity 307. Spring 316 may comprise at least one of: at least one coil spring, at least one disc spring, and a combination thereof. As shown in FIG. 3, spring 316 is a compression spring. Spring 316 is designed to maintain a substantial force to overcome any anticipated drag load caused by friction during retrieval from wellbore 101 and to keep substantial closing force on grab arms 322. In operation, spring 316 is initially locked in a preloaded condition by shear pin 313 that is pressed through housing 314 and into piston 315.

Figure 4:
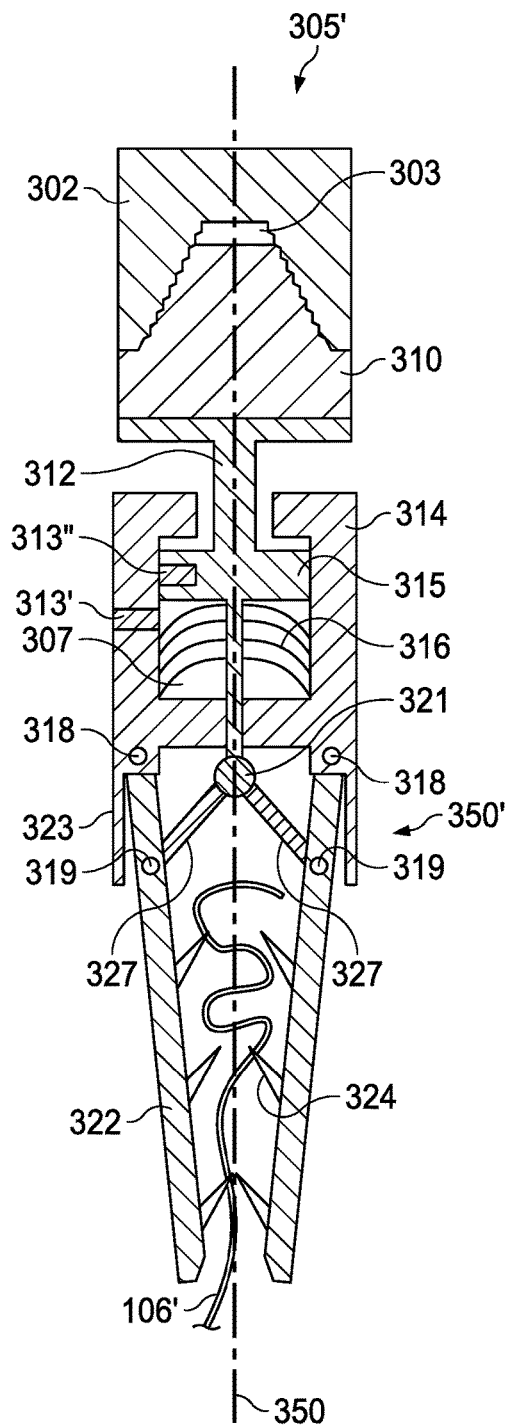
FIG. 4 shows an example of the cable grab assembly of FIG. 3 in an activated condition.

Piston link 320 connects piston 315 to link pivot 321. Link pivot 321 pivotally links arm links 327 to grab arms 322. Grab arms 322 are pivotally attached to housing 314 by pins 318. While shown with two grab arms 322, any suitable number of grab arms may be used within the geometric constraints of wellbore 101. Similarly, link arms 327 are attached to grab arms 322 by pins 319. The linkage connections of piston link 320, link pivot 321, arm link 327 comprise a linkage assembly 350' that operatively connects piston 315 to grab arms 327 such that upward movement of piston 315 in cavity 307, relative to housing 314, causes inward motion of arms 322. In one embodiment, constraint arms 323 may be attached to housing 314 to prevent over-extension of grab arms 322. FIG. 4 shows an activated cable grab assembly 305'.

Figure 5:
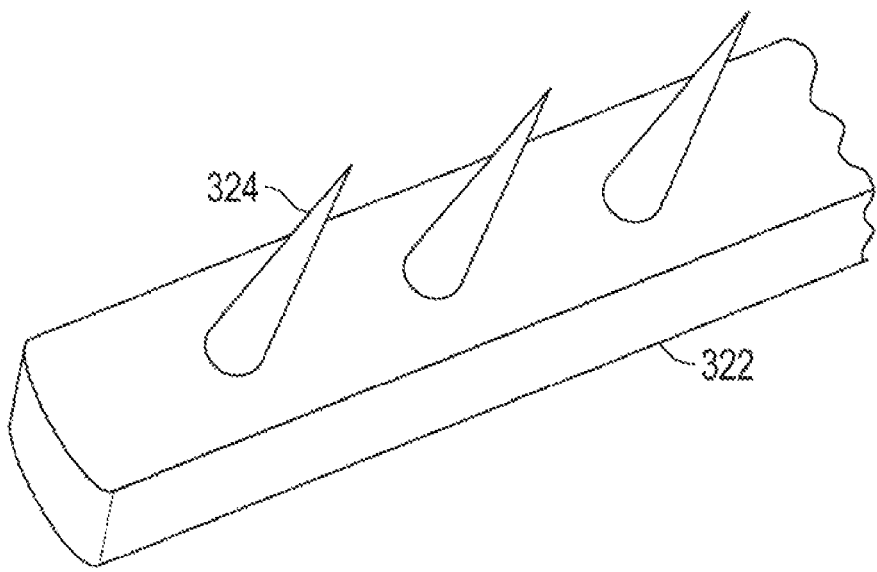
FIG. 5 shows an example of a grab arm with spike protrusions.
Figure 6:
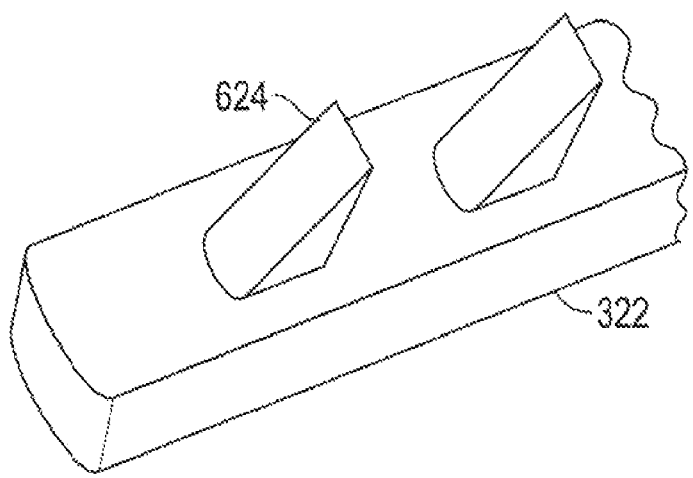
FIG. 6 shows an example of a grab arm with tooth-shaped protrusions.

Engagement elements 324, also called protrusions, are located on grab arms 322 to entangle a broken cable for retrieval. Engagement elements 324 may be spike shaped, see FIG. 5. Alternatively, see FIG. 6, a tooth shaped protrusion 524 may be used. In one example, the outer surfaces of engagement elements 324, 624 and/or the outer surfaces of grab arms 322 may be treated to increase the friction between the surface and an entangled cable to enhance successful cable retrieval. The surface treatment may comprise at least one of: a tungsten carbide coating, a tungsten coating, an ion nitride treatment, and a carburization treatment. Such treatments are commercially available and are not discussed here in detail.

In operation, fishing assembly 300 may be run into wellbore 101 to contact broken cable 106'. Deployment member 306 is pulled up, and the deployment member tension is compared to the deployment tension before the entanglement. When it is judged that broken cable 106' is sufficiently entangled in open grab arms 322, jarring tool 302 is activated to shear shear-pin 313 into separate shear-pin parts 313' and 313". Alternatively, sufficient tension may be applied to deployment member 306 to shear shear-pin 313. In yet another alternative, a combination of jarring and tension may be applied to shear shear-pin 313. Shearing of shear-pin 313 allows spring 316 to push piston 315 upward relative to housing 314 to generate inward motion of grab arms 322 as described above. As described above, at full extension, spring 316 continues to provide positive capture force of broken cable 106' throughout the remainder of the retrieval. At the surface, the cable may be disengaged, a new shear pin installed, and the process repeated, as necessary, to retrieve additional cable lengths.

In one example, shearing of the shear-pin 313 generates a change in tension in deployment member 306 that is detectable by weight/speed indicator 108 at the surface to indicate that the grab arms 322 are activated, and that retrieval to the surface should begin.

The invention claimed is:

1. A cable grab assembly to retrieve a broken cable from a well comprising:
   a body having a longitudinally extending internal cavity disposed therein;
   a piston disposed in the cavity, the piston axially moveable between a first position and a second position;
   at least two grab arms hingedly attached to a bottom end of the body;
   a linkage assembly to operatively couple the piston and the at least two grab arms such that movement of the piston between the first position toward the second position causes the at least two grab arms to pivot inward from an open position toward a closed position;
   a shear-pin engaged with the piston and the body to restrain the piston to the first position; and
   at least one spring element disposed between the piston and an end of the cavity to shift the piston from the first position toward the second position to capture the broken cable when the shear-pin is sheared;
   wherein the at least one spring shifts the piston from the first position toward the second position by decompressing.

2. The cable grab assembly of claim 1 wherein the at least one spring element is chosen from the group consisting of: at least one coil spring, at least one disc spring, and a combination thereof.

3. The cable grab assembly of claim 1 further comprising at least one engagement element on each grab arm.

4. The cable grab assembly of claim 3 wherein the at least one engagement element is chosen from the group consisting of: a spike element and a tooth element.

5. The cable grab assembly of claim 4 further comprising a friction enhanced surface treatment on at least one of the at least one grab arms and the at least one engagement element.

6. The cable grab assembly of claim 5 wherein the friction enhanced surface treatment is chosen from the group consisting of: a tungsten carbide coating, a tungsten coating, an ion nitride treatment, and carburization treatment.

7. A method for retrieving a broken cable in a wellbore comprising:
   extending a cable grab assembly having a longitudinally extending body into a wellbore to engage the broken cable;
   disposing a piston in a longitudinally extending internal cavity in the body, the piston moveable between a first position and a second position;
   hingedly attaching at least two grab arms to a bottom end of the body;
   operatively coupling a linkage assembly to the piston and the at least two grab arms such that movement of the piston between the first position toward the second position causes the at least two grab arms to move inward from an open position toward a closed position;
   engaging a shear-pin with the piston and the body to restrain the piston to the first position;
   disposing at least one compressed spring element between the piston and an end of the cavity;
   shearing the shear-pin to allow the compressed spring to decompress and shift the piston from the first position toward the second position causing the at least two grab arms to move inward to capture the broken cable; and
   retrieving the broken cable to the surface.

8. The method of claim 7 wherein the at least one spring element is chosen from the group consisting of: at least one coil spring, at least one disc spring, and a combination thereof.

9. The method of claim 7 further comprising disposing at least one engagement element on each grab arm.

10. The method of claim 9 wherein the at least one engagement element is chosen from the group consisting of: a spike element and a tooth element.

11. The method of claim 10 further comprising disposing a friction enhanced surface treatment on at least one of the at least one grab arm and the at least one engagement element.

12. The method of claim 11 wherein the friction enhanced surface treatment is chosen from the group consisting of: a tungsten carbide coating, a tungsten coating, a nitride treatment, and a carburization treatment.

13. The method of claim 7 wherein shearing the shear-pin comprises at least one of: pulling on a deployment member from the surface, actuating a jarring tool operatively coupled to the cable grab assembly, and combinations thereof.

\* \* \* \* \*